United States Patent [19]

Sharvit

[11] 4,346,264
[45] Aug. 24, 1982

[54] TELEPHONE CALL RESTRICTION APPARATUS

[75] Inventor: Martin M. Sharvit, Thornhill, Canada

[73] Assignee: Cindon Research Inc., Rexdale, Canada

[21] Appl. No.: 136,734

[22] Filed: Apr. 2, 1980

[51] Int. Cl.³ .............................................. H04M 1/66
[52] U.S. Cl. ............................................... 179/18 DA
[58] Field of Search ............. 179/18 DA, 90 D, 81 R, 179/27 CB

[56] References Cited

U.S. PATENT DOCUMENTS

| | | | |
|---|---|---|---|
| 3,860,763 | 1/1975 | Sudoh et al. | 179/18 DA |
| 3,873,781 | 3/1975 | Nissim | 179/81 R |
| 3,936,617 | 2/1976 | Bolgiano | 179/84 R |
| 3,992,588 | 11/1976 | Hunsicker | 179/6.3 R |
| 4,099,033 | 7/1978 | Murray | 179/90 D |
| 4,188,508 | 2/1980 | Rogers et al. | 179/18 DA |
| 4,234,764 | 11/1980 | Beebe | 179/90 D |
| 4,251,692 | 2/1981 | Waldman | 179/18 DA |

FOREIGN PATENT DOCUMENTS

| | | |
|---|---|---|
| 1124560 | 3/1962 | Fed. Rep. of Germany ........ 179/18 DA |
| 1814584 | 6/1970 | Fed. Rep. of Germany ........ 179/18 DA |
| 45-27168 | 9/1970 | Japan ............................. 179/18 DA |

*Primary Examiner*—Thomas W. Brown
*Attorney, Agent, or Firm*—Leon Arthurs; Kenneth M. Garrett

[57] ABSTRACT

A telephone call restrictor which is suitable for use in a PABX installation with pulse dial telephones includes a load which may be selectively connectable across the central office lines so as to inhibit reception of pulse signals by the central office when connected. The restrictor includes a detector which provides an output to disconnect the load upon receipt of an access code dialed at the telephone. The restrictor will normally include a prohibited number detector which will be disabled by the output from the access code detector.

18 Claims, 13 Drawing Figures

TELEPHONE CALL RESTRICTION APPARATUS

FIELD OF THE INVENTION

This invention relates to telephone instrumentation. It particularly relates to telephone call restriction systems for inhibiting telephone calls unless a programable access code is used. Still more particularly, it relates to such systems for use with Private Automatic Branch Exchange (PABX) installation; although it is not necessarily confined thereto.

BACKGROUND OF INVENTION

It is frequently desirable to restrict the use of telephones, for example so as to avoid unauthorized toll charges. Apparatus for giving effect to this aim is known. Such apparatus in one form thereof includes counting means for counting the number of dial pulls. When these exceed a certain number, generally seven, simple logic means provides an output signal which serves to actuate line disconnect means. In another form of the apparatus, counting means is provided to count one or more dialed digits. Logic means is provided giving an output signal which serves to actuate line disconnect means when a dialed pulse or pulses correspond to predetermined prohibited numbers. Generally in this apparatus the prohibited numbers will comprise the numbers 0 or 1 as the first dialed digit, and 1 as the second dialed digit; the third digit may also comprise a prohibited number. In a variation of this form of apparatus, logic circuitry is programmed to accept specific numbers, generally three digit numbers indicative of local exchanges, and deny all others. Each of the above described forms of the apparatus may be considered to comprise input circuitry for receiving signals representing dialed digits, detection circuitry to recognize prohibited digits, and blocking circuitry responsive to the detection circuitry to restrict the communication.

In many commercial organizations where it is desirable to use a restriction system it may be desirable or even necessary to overcome or disable the system so that selected personnel are able to have complete and unrestricted access to any exchange and number they require. This has been recognized in the past. U.S. Pat. No. 3,873,781—NISSIM, dated Mar. 25, 1975 describes an arrangement where the hand set remains in the cradle while an "access" code is dialed to overcome the restriction. This required a special dial mechanism or switching mechanism at the telephone set. A somewhat similar solution is described in U.S. Pat. No. 4,099,033—MURRAY, dated July 4, 1978 where unauthorized use of a telephone is ensured by a restrictive system where authorized users are provided with a code to be dialed in on a special telephone set or on separate equipment attached to the telephone set. Again, there must be special equipment at the set. Other ways of providing access of unlimited dialing privileges (i.e. unrestricted calling privileges) to authorized users are by means of a coded card inserted into an accessory at the telephone set as described in U.S. Pat. No. 4,045,619—HARRINGTON, dated Aug. 30, 1977, and by means of a precise tone generator applied to the telephone mouth piece as described in U.S. Pat. No. 4,096,357—MOGTADER, dated June 20, 1978. All these require modified or auxiliary equipment at the telephone set.

In my co-pending application Ser. No. 136,735, filed Apr. 2, 1980, now U.S. Pat. No. 4,314,108, commonly assigned herewith, I describe a telephone call restrictor including means for overcoming or disabling the restrictor in response to an access code being dialed using a standard hand set. Briefly, in such system, the hand set is unhooked to seize a central office line, and a programmable code is dialed so as to disable the restrictor. It will be appreciated that in operation the dialed in code will have been received by the central office and acted upon there, and that such signal must be cleared from the central office before dialing the desired telephone number. Clearing is most easily effected by rehooking the phone to release the central office line. My aforesaid toll restrictor includes circuitry for retaining the restrictor in a disabled condition for a short period within which the central office signal may be cleared and the desired telephone number dialed in. Such mode of operation is suitable for key set operation wherein a telephone set is associated with a specific trunk line. In a PABX (Private Automatic Branch Exchange) system, several lines connect between the central office and the PABX. A toll restrictor would normally locate on the central office side of the PABX, and would only be engaged by seizing a central office line, normally by dialing 9. Assuming a line to be seized and an access code to have been dialed in so as to disable the toll restrictor, when the signal is cleared from the central office by hooking the telephone, the seized line and its associated, now disabled, toll restrictor is released. A new line must be seized by dialing 9; however, the PABX will normally allocate lines on a next available line basis, hence it is probable that the newly allocated line will not be that which was earlier engaged. Not only is the user's attempt to dial out frustrated, but one outgoing line remains open for a short period for uncontrolled use.

It is therefore an object of this invention to provide a telephone restriction apparatus suitable for use in a PABX system having means for overcoming or disabling the restriction in response to an access code being dialed.

It is another object of the invention to provide a restriction apparatus as aforesaid which can be disabled by a number code dialed from an unaltered or standard telephone set.

It is yet another object of the invention to provide a telephone restriction apparatus which in one condition will restrict one type of call whilst permitting other types and in another condition will permit all types subject to the access code being dialed, and which may be conditioned using a standard telephone set.

SUMMARY OF THE INVENTION

In a broad aspect, a telephone call restrictor embodying my invention includes a pair of terminals for connecting the restrictor to a central office line, a load connectable to the terminals so that the transmission of dial pulses to the central office are inhibited, and a switch which is actuatable to connect and disconnect the load. A counter means is provided to count the pulses of dialed digits, and access code detection means is provided which generates a first output signal on recognition of one or more digits forming an access code. This output signal serves to actuate the switch to disconnect the load, and permit communication with the central office.

Desirably the telephone restrictor will include means for detecting the entry of a prohibited digit or sequence of digits and providing a second output signal on recognition thereof, the second output signal serving to inhibit or block communication with the central office. The first output signal frustrates the second output signal, whereby the receipt by the restrictor of an otherwise prohibited digit or sequence thereof will not inhibit communication with the central office.

In a further aspect of the invention, means controllable by a user using an unmodified telephone set, permits the load to be optionally connected prior to the desired entry of the access code, so as to frustrate the second output signal, or to be disconnected where it is desired to make a telephone call not subject to inhibition.

In a still further aspect, the invention comprises a telephone call restrictor having an input impedance of at least 1 megohm.

In yet another aspect, the invention comprises a telephone call restrictor connectable to central office lines solely by a parallel connection, and including inhibition of the transmission of the "0" digit to the central office when this is a prohibited digit.

Other aspects and objects of my invention will become apparent from a consideration of the following description of a preferred embodiment thereof. Such description is exemplary only, and is not to be taken as being limiting of the scope of the invention.

DESCRIPTION OF THE PREFERRED EMBODIMENTS

Figure 1:
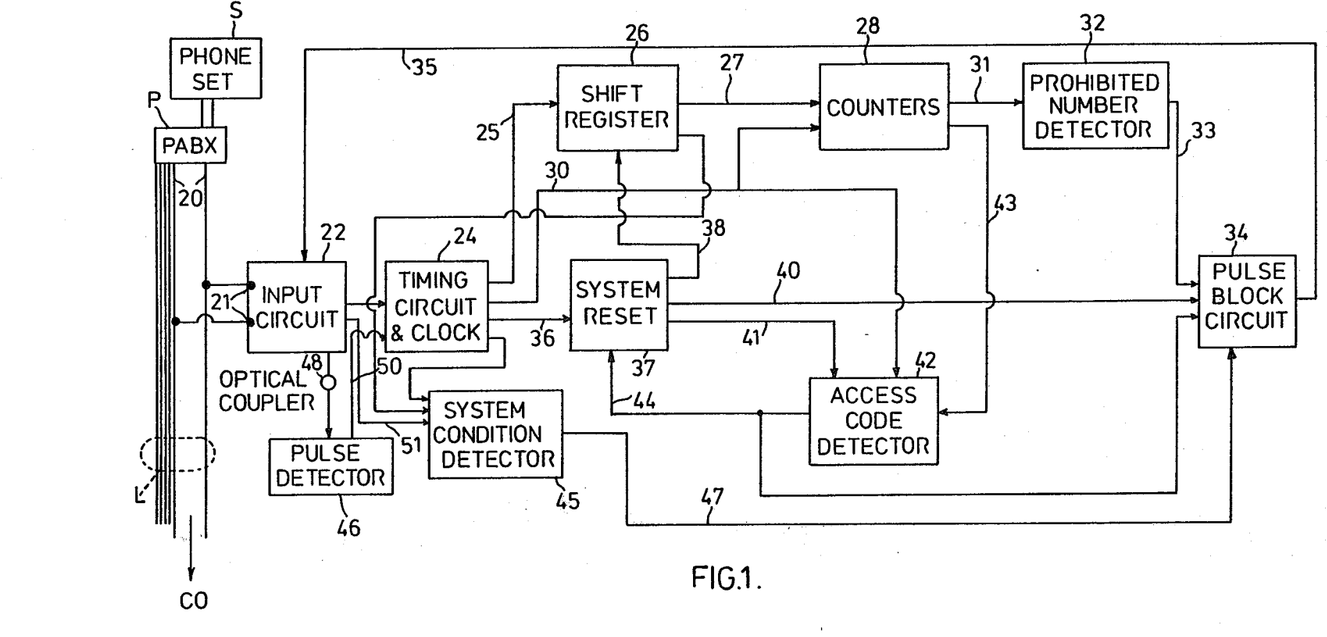
FIG. 1—is a block diagram of one embodiment of the invention.

Referring to FIG. 1, there is shown a simplified block circuit diagram of one form of the invention. The telephone circuit is represented by a pair of conductors 20, one of which is the "tip" line and the other the "ring" line. Input circuit 22 is connected across the lines 20 at terminals 21. The input circuit 22 detects the dialing pulses on the lines 20, and provides a signal representing the dialing pulses to timing circuit and clock 24. The timing circuit and clock 24 provides a pulse on the conductor 25 causing the shift register 26 to shift one position and provide a signal on conductor 27 which initiates operation of the first counter in counters block 28 to count the dial pulse signal on conductor 30. When the next digit is dialed, the timing circuit and clock 24 provides a pulse which causes shift register 26 to shift another position to initiate operation of the second counter in counters block 28.

Counters block 28 preferably has three decade counters. The output from selected pins thereof such as "0" or "1" is strapped by conductors 31 to a prohibited number detector means 32 which, in response to a signal on conductors 31 representing a prohibited digit or combination, provides a signal on conductor 33 to pulse block circuit 34. Pulse block circuit 34 then provides a signal on conductor 35 which enables a switch in input circuit 22 to prevent the dial pulses from the telephone instrument from reaching the central office. Consequently the call will be frustrated.

In order that authorized people having knowledge of a predetermined access code can overcome or disable the restriction, an access code detector circuit 42 is provided. Access code detector 42 is strapped to preselected output pins of counters 28 by conductors 43. When the three digit code has been dialed which corresponds to the preselected three digits, then three signals are received by access code detector 42 which provides an output on conductor 44 connecting to system reset 37, further transmitted on conductors 38 and 40 to reset the shift register 26 and pulse block circuit 34 and thence by conductor 35 to remove the pulse block.

As thus far described, the apparatus has elements in common with my aforementioned co-pending application. In the embodiment of the instant invention wherein the apparatus is suited for use in a PABX installation, I further provide a system condition detection means 45 and a pulse detector 46 which detects pulses under a load.

In the much simplified representation of FIG. 1, lines 20 connect between a central office CO and a PABX installation P, with input circuit 22 coupled in parallel as indicated. A plurality of other lines L will also connect between central office CO and PABX installation P. Considering a phone set S connecting to the PABX installation P, when the phone set S is unhooked and a "9" is dialed, the PABX switching system will seize a central office line, here assumed to be lines 20 and the toll restrictor apparatus associated therewith.

At the moment the trunk line is seized, the power source from the central exchange will give a momentary DC voltage surge (for example, a 50 volt surge). This surge is used to provide a signal to system reset 37 to reset the entire restriction system. After the momentary surge, the trunk line voltage will drop to a voltage between approximately 6 and 13 volts DC. This is the off-hook voltage.

The system condition detection means 45 is responsive to the detection of an off-hook voltage at terminals 21 and the receipt of an off-hook pulse signal generated by the change of line voltage from about 50 to the off-hook voltage and starts a delay timer. After the delay period (perhaps of the order of 5 or 6 seconds) a signal is provided on conductor 47 to pulse block circuit 34. Pulse block circuit 34 provides a signal on conductor 35 which operates a switch in input circuit 22 placing a resistance across terminals 21 and thus lines 20. With this resistance across the lines 20, any make/break dialing pulses will not be detected at the central exchange. Dialing pulses are however, detected in input circuit 22 and used to actuate an optical coupler 48 to provide a pulse signal on conductor 50 which is counted in the aforedescribed manner to determine if the correct access code has been dialed. If it has, then the code detector 42 initiates a reset signal which removes the resistance from lines 20 and permits the user to dial the desired number.

It is believed that the system according to the invention has been described in sufficient detail to provide a satisfactory understanding of the broad aspects of the invention. However, in order to ensure that there is no lack of completeness the more salient features of a specific circuit suitable for PABX operation will be described. The circuit is broken down into blocks which generally equate to those described in FIG. 1, although these are here numbered in accordance with the Fig. number.

Figure 2:
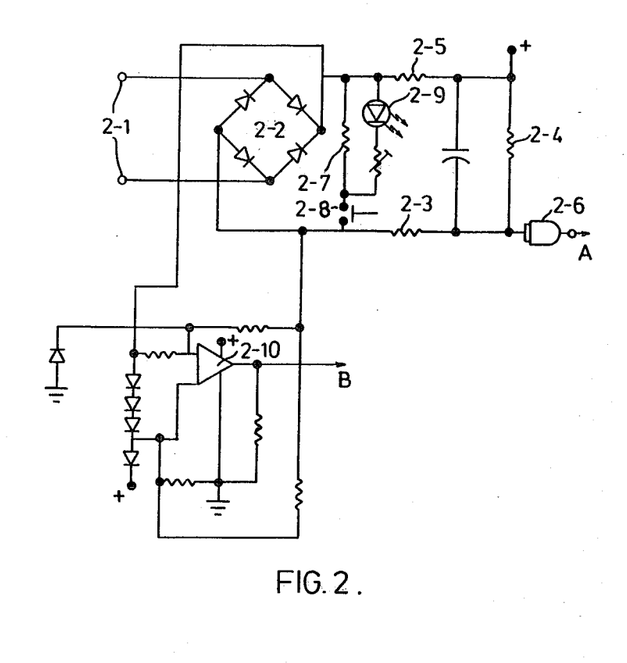
FIG. 2—is a circuit diagram showing details of the input and pulse detector, and the load resistance.

INPUT CIRCUIT AND PULSE DETECTOR: FIG. 2

A pair of terminals 2-1 corresponding to terminals 21 of FIG. 1 are provided for connecting the telephone call restrictor to the tip and ring lines of a PABX system on the central office side of the PABX installation as shown in FIG. 1. Terminals 2-1 connect to rectifier bridge 2-2 for polarity control. The output of bridge 2-2 connects to the ends of a high impedance voltage divider network formed by resistors 2-3, 2-4 and 2-5 having values of about 5, 1 and 5 megohms respectively. The restrictor system voltage of about 6 volts connects to the junction of resistors 2-4, 2-5. When a dial pulse is received at terminals 2-1 the voltage will pulse from a low in the range of about 5–20 volts to a high of about 50 volts. The corresponding voltage pulse measured at the junction of resistors 2-3, 2-4 will be inverted, going from a high of about 5.5 volts to a low of about 0.5 volts. Thus voltage pulse is applied to the input of a CMOS Schmitt trigger NAND gate 2-6, and is adequate to provide a reliable pulse output therefrom at A without interference of the transmission of the pulse input signals to the central office.

A load resistor 2-7 having switch contacts 2-8 in series therewith connects across the output of bridge 2-2. Resistor 2-7 has a value so as to effectively shunt the line connecting to the central office to prevent pulse communication therewith when contacts 2-8 are closed. In the ensuing description, the load resistor 2-7 when switch contacts 2-8 are closed will be referred to generally as a load ON or under load condition and when the switch contacts are open as a load oFF condition. When the load is ON the voltage change at the input of gate 2-6 upon the receipt of a dial pulse at terminals 2-1 is insufficient to pulse gate 2-6 reliably. I therefore provide a second pulse detector circuit for the detection of pulses under load condition.

Figure 3:
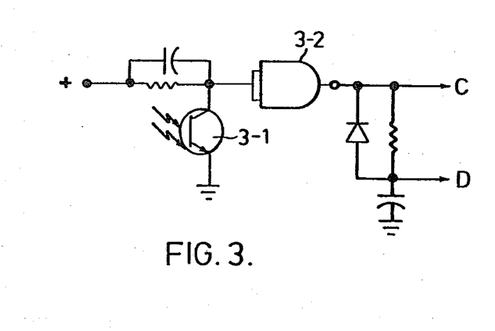
FIG. 3—is a circuit diagram showing detail of the on load pulse detector.

ON LOAD PULSE DETECTOR: FIGS. 2–3

Figure 5:
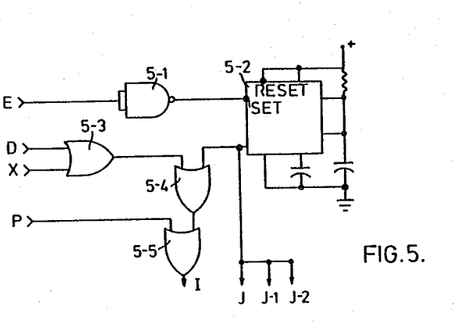
FIG. 5—is a circuit diagram showing the reset system.

A LED device 2-9 connects parallel with load resistor 2-7 and series with switch contacts 2-8 so as to effectively form part of the load. When the load is ON the receipt of a dial pulse at terminals 2-1 will pulse LED 2-9. LED 2-9 is optically coupled to a photo Darlington device 3-1, which provides the input for NAND gate 3-2, to generate a reliable pulse output at C on receipt of a dial pulse input at terminal 2-1 when the load is ON. The output of NAND gate 3-2 also connects to an R-C delay circuit which provides a high output at D when the load is ON and the telephone is hooked for more than about 200 ms., which is coupled to the reset system (FIG. 5).

VOLTAGE DETECTOR: FIG. 2

Figure 10:
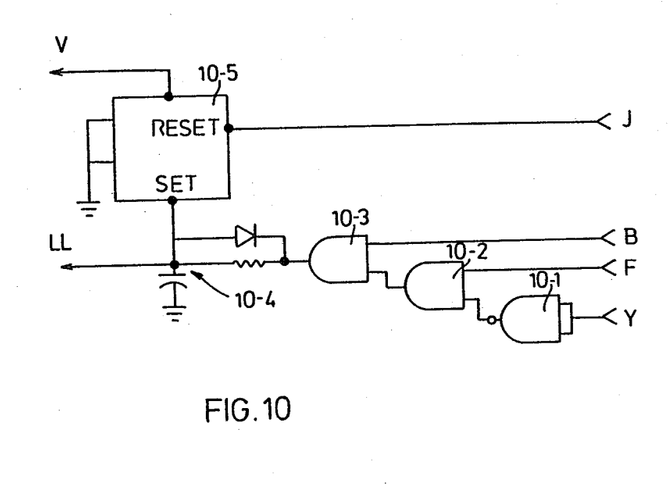
FIG. 10—is a circuit diagram showing the system condition detector.

The output of bridge 2-2 connects to a voltage detector used for determining the condition of the line system, in particular to distinguish between a seized line state and a line release state which in a ground start PABX will normally be at ground potential. The voltage detector comprises an operational amplifier 2-10 connected such that as long as the output voltage of bridge 2-2 exceeds about 5 volts, the output at B will be high. This high output is used as an enabling signal for the system condition detector (FIG. 10).

Figure 4:
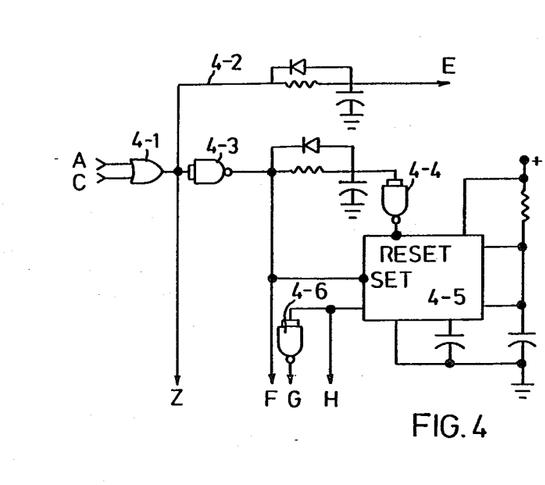
FIG. 4—is a circuit diagram showing the timing circuit and clock.

TIMING CIRCUIT AND CLOCK: FIG. 4

Figure 6:
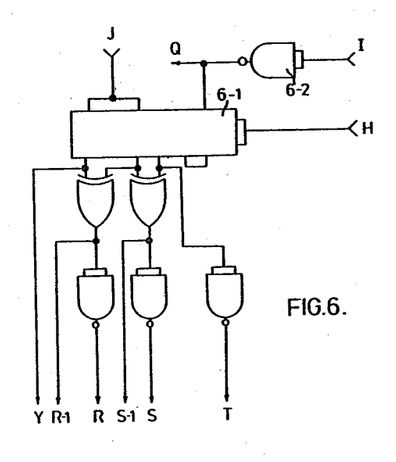
FIG. 6—is a circuit diagram showing the shifter unit.

The pulse outputs A and C from the pulse detector circuits of FIGS. 2 and 3 are coupled at OR gate 4-1 of FIG. 4 to provide the input for the timing circuit and clock. The output of gate 4-1 is connected by conductor 4-2 to an R-C time delay circuit. This provides a high output at E used for resetting purposes when an on-hook voltage is experienced at terminals 2-1 for more than about 200 ms. In a ground start PABX system, this condition will obtain upon initial seizure of the line, when a 50 volt signal is initially impressed on the line following which the line voltage drops to the normal off-hook value. The output of gate 4-1 at Z connects to the counters block (FIG. 6). The output of gate 4-1 is inverted at gate 4-3. The output F of this gate is high when the phone is off hook whether or not the load is connected, and provides a system condition signal for the system condition detector (FIG. 10). The output of gate 4-3 connects through an R-C delay circuit and NAND gate to a timer 4-5 to provide a shift pulse output at H and after inversion at gate 4-6 a master clock gating pulse at G properly synchronized with the pulse output at Z which connects to the counters.

RESET: FIG. 5

Figure 8:
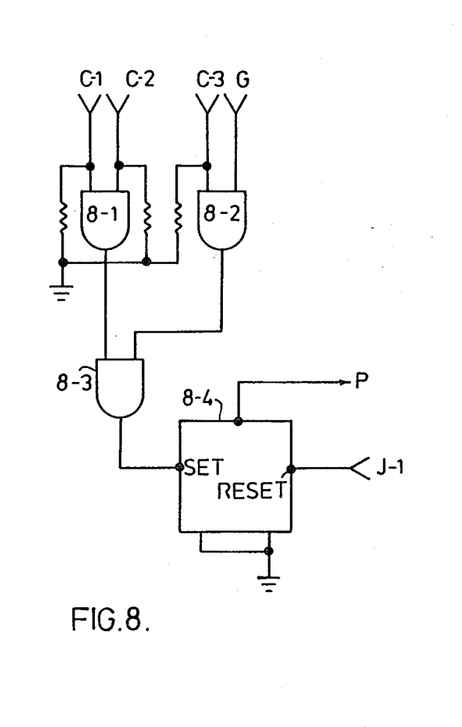
FIG. 8—is a circuit diagram showing the access code detector.

A master reset input signal for setting all units of the telephone restrictor to their starting condition and generated as described in FIG. 4 above is received at E, and after inversion at gate 5-1 enables timer 5-2 to provide a master reset output at J, J-1 and J-2 for resetting the shifter, FIG. 6, code detector, FIG. 8, and system condition detector, FIG. 10. The master reset output is coupled to other reset signals inputted at D, X, and P through a series of OR gates 5-3, 5-4 and 5-5, and outputted at I for resetting the shifter and pulse block switch (FIG. 11), the latter controlling switch contacts 2-8. The generation of input signal D was earlier described in reference to FIG. 3. The generation of signals X and P will be described in reference to FIGS. 9B and 8 respectively.

Figure 7:
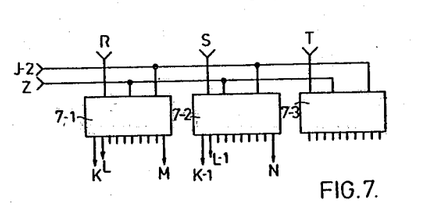
FIG. 7—is a circuit diagram showing the counters unit.

SHIFTER AND COUNTERS: FIGS. 6 and 7

The shifter and counter units are generally of a conventional nature and it is not believed necessary to describe them in detail. Pulse input Z, clock input H and resetting inputs I, J and J-2 have been described in relation to earlier Figures. For reference purposes the shifter is denoted as 6-1 and the three digit counters for counting the first three dialed digits as 7-1, 7-2 and 7-3. Shifter 6-1 outputs R, S and T connect to and gate digit counters 7-1, 7-2, 7-3 respectively. The remaining outputs of shifter 6-1, shown as Y, R-1 and S-1 will be described more particularly in relation to the later units controlled by them.

Figure 11:
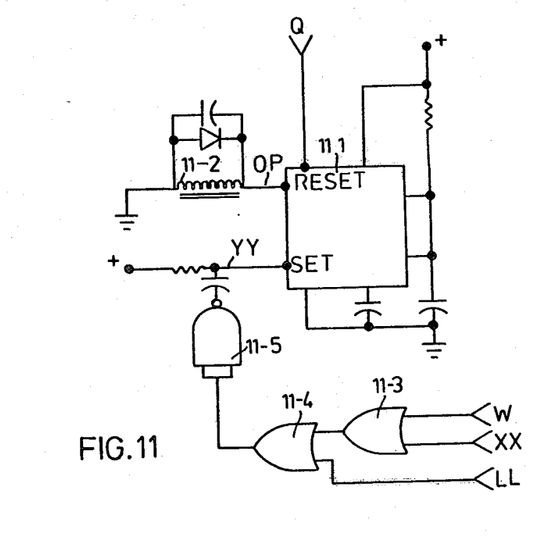
FIG. 11—is a circuit diagram showing the pulse block switch unit.

PULSE BLOCK SWITCH UNIT: FIG. 11

This unit is next described for an easier understanding of the operation and organization of this embodiment of the telephone restrictor as a whole. The unit comprises a timer switch 11-1 having a setting input at YY, a resetting input at Q and an output OP. A relay 11-2 connects to output OP, the relay controlling switch contacts 2-8 to switch the load 2-7 ON or OFF. Since the condition of the load determines whether or not dial pulses will be blocked, i.e. precluded from being transmitted to the central office, the timer switch may be referred to generally as the pulse block switch.

The output OP of timer switch 11-1 and thus the load condition relates to the setting and resetting input signals of the timer switch as follows:

TABLE 1

| Conditioning of timer switch 11-1 | | | | |
| --- | --- | --- | --- | --- |
| YY | 0 | 0 | 1 | 1 |
| Q | 0 | 1 | 0 | 1 |
| OP | 0 | 1 | 0 | 0 or 1 → 0 |
| Load | OFF | ON | OFF | OFF or ON → OFF |

The output OP when the setting or resetting input signals of timer switch 11-1 change in accordance with any of the conditions of the first three columns of Table 1 changes instantaneously with the changed input. When the condition of column 2 changes to that of column 4 i.e. Q=1, YY changes from 0 to 1, the output OP is initially 1 and changes after a delay period of several seconds to 0. When the condition of column 3 changes to that of column 4, the output OP remains 0.

The signals received at YY are inputted at W, XX and LL at OR gates 11-3, 11-4, and inverted at NAND gate 11-5. A high signal inputted at W, XX and LL will thus turn the load ON to inhibit pulse communication with the central office whenever a high signal is inputted at Q, i.e. in the absence of a reset signal.

The normal condition of timer switch 11-1 upon application of a master reset signal to the restrictor is as shown in column 3.

Figure 9A:
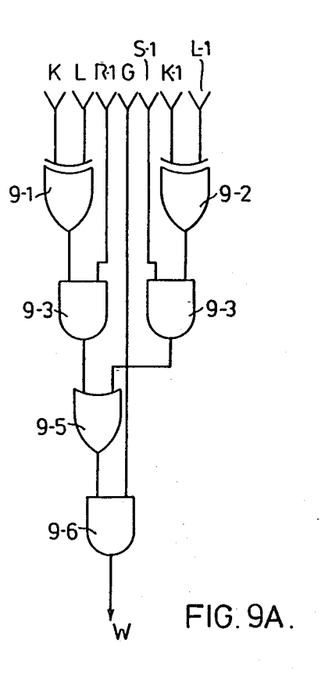
FIGS. 9A, 9B—are circuit diagrams showing the prohibited number detector.
Figure 9B:
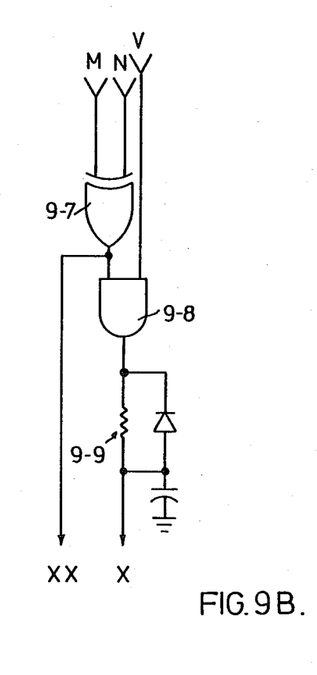

PROHIBITED NUMBER DETECTOR: FIGS. 9A, 9B

Figure 12:
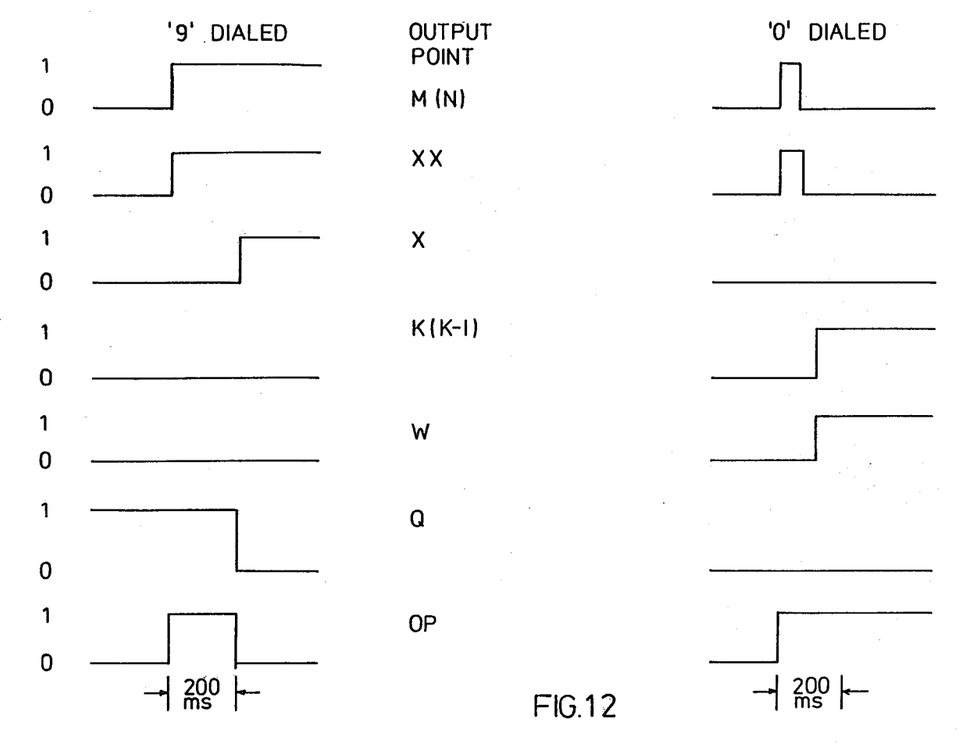
FIG. 12—shows in detail outputs in connection with the detection of prohibited digits.

A detector for an "0" or "1" dialed as a first or second digit is generally of a conventional nature as seen in FIG. 9A. Inputs K, L and K-1, L-1 are strapped to the 0 and 1 input terminals of counters 7-1 and 7-2 respectively and combined at exclusive OR gates 9-1 and 9-2 respectively. The outputs therefrom pass through AND gates 9-3, 9-4 which are respectively enabled by high signals received at R-1, S-1 from shifter 6-1, and are combined at OR gate 9-5. The output of gate 9-5 is inputted to AND gate 9-6 which must be enabled by a master clock signal outputted at G from the timer and clock circuit (FIG. 4). This provides a high output at W to turn the pulse block ON. It will be appreciated that this output could, in accordance with known practice, be used to curtail or otherwise frustrate communication with the central office by means other than a shunt load placed across the telephone lines. It will also be appreciated that where a shunt load is used for restricting communication it will prevent the transmission of dial pulses to the central office, but voice communication will not be frustrated. It is essential that the pulse block be turned ON before a voice responsive circuit between the telephone and the central office is established. Since such circuit may be established upon receipt by the central office at the tenth pulse of the number "0" when dialed as a first or second digit, it is required to frustrate the complete transmission of the ten dial pulses. It is also required to permit the number "9" to be dialed and received by the central office as this is not normally a prohibited number. Effectively, in order to inhibit the transmission of a prohibited "0" signal, the last pulse thereof must be blocked. Referring to FIG. 9B, inputs M and N of exclusive OR gate 9-7 are strapped to the "9" output terminals of counters 7-1 and 7-2, to provide a high output XX when M or N is high which will turn the pulse block ON. Referring also to FIG. 12, if the digit dialed is "0", the high output at M or N as the case may be will be transient, about 60 ms. The load will turn ON as the output of XX goes high, and will remain ON for a short period after XX goes low. In this period, the output at K or K-1 will go high to provide a high output at W, which will maintain the load ON. Since the load was ON prior to the generation of the tenth dial pulse, this pulse will not be transmitted to the central office. Assuming now the digit "9" to be dialed on the first or second dial pull, the output at M or N will remain high as will the output XX. The load will be turned ON and will remain ON until a reset signal is applied at reset Q of timer switch 11-1. Referring to FIG. 9B, the output XX of OR gate 9-7 also connects to AND gate 9-8. This gate is enabled by a high at V derived from the system condition detector (FIG. 10) and which will be normally present. The high output of gate 9-8 is experienced at X after a delay provided by an interposed R-C delay circuit 9-9 of greater than pulse width, and about 200 ms. This output connects to the reset system (FIG. 5) and is outputted therefrom without change at I. A high output at I is inverted at NAND gate 6-2 and applied to shifter 6-1 to cancel the output at M or N and also to provide a low at reset terminal Q of timer switch 11-1 to turn the load OFF immediately. This reset signal will not be generated when "0" is dialed, as the time delay interposed at 9-9 is greater than the duration of the transient output at M or N. Moreover, the application of the load for the duration of the time delay will not impede the communication of the next dialed digit as the time delay is chosen so as not to exceed the normal inter-digit delay period.

SYSTEM CONDITION DETECTOR: FIG. 10

In order to disable the restrictor so as to permit authorized persons to make otherwise prohibited telephone calls, I provide an access code detector for detecting a code dialed in to the restrictor, as will be described in more detail shortly. In order to prevent the access code when dialed in from being transmitted to the central office, I provide a system condition detector which will automatically turn the load ON. Referring to FIG. 10, the system condition detector comprises serially linked NAND gate 10-1 and AND gates 10-2, 10-3. The output of gate 10-3 is high on receipt of a high signal at both B and F derived respectively from the voltage detector (FIG. 2) when the line is seized, and from the off-hook detector (FIG. 4); also a low signal must be inputted at Y. This signal derives from shifter 6-1 prior to any pulse having been dialed into the restrictor. A high output from gate 10-3 is experienced at LL after a delay of about 6 seconds provided by interposed R-C delay circuit 10-4. Receipt of the high signal at input LL of the pulse block switch circuit (FIG. 11) will turn the load ON. It will be appreciated that if a digit is dialed before a high is experienced at LL the load will not be turned ON. Thus, assuming it is wished to dial a non-prohibited number, dialing would commence at any time prior to the expiration of the delay period of delay circuit 10-4, and this would disable the system condition detector output.

ACCESS CODE DETECTOR: FIG. 8

Preselected output terminals of digit counters 7-1, 7-2 and 7-3 forming a suitable predetermined access code are connected to the inputs at C1, C2, C3 of AND gates 8-1 and 8-2, the latter also being enabled by a master clock pulse input at G. The outputs of gates 8-1 and 8-2 are combined at AND gate 8-3 which in turn connects to the setting input of flip-flop 8-4. The output P of flip flop 8-4 will be high upon receipt of the access code and master clock pulse at the access code detector inputs and will remain high until a master resetting high is input at J-1. Output P connects to OR gate 5-5 of the reset system (FIG. 4) and is outputted unchanged at I, this in turn providing the input for NAND gate 6-2 (FIG. 6) as previously described in relation to FIG. 9B. A high input at I generated when the access code is inputted to the restrictor provides a low output at Q which immediately resets timer switch 11-1 (FIG. 10) to turn the load OFF. It will be appreciated that the load will remain OFF until a master reset signal is applied at J-1.

As previously described in relation to FIG. 9, in this preferred embodiment, when a "9" is dialed as a first or second digit, a high output at X will provide a disabling signal at Q for resetting the timer switch 11-1 to disconnect the load. It is disirable that the number "9" be available to form either of the first two digits of the access code. For this purpose, when the load is connected by setting timer switch 11-1 by a high signal generated by the system condition detector (FIG. 10), this same signal is applied to a flip flop 10-5 giving a low output at V. With reference to FIG. 9B, the output V controls AND gate 9-8, and will inhibit the output at X so that timer switch 11-1 will not be switched OFF when "9" is dialed as part of the access code.

In summary, to use the telephone call restrictor for the purpose of making an otherwise prohibited telephone call, a user will seize a line, and wait without dialing until the delay period of the system condition detector has expired. The system condition detector will turn timer switch 11-1, ON, to energize solenoid 11-2 and close contacts 2-8, so connecting the load 2-7. The closure of contacts 2-8 will produce a voltage spike and a signal at the telephone set to indicate to the user that the load is ON. The access code may then be dialed by a standard hand set and the pulses will be read at the pulse detector formed by LED 2-9 and Darlington 3-1 to provide a pulsed output for detection by the access code detector. The pulses will not be read by the central office, and the line will not be released. Upon detection of the access code, the timer switch will be disabled and will remain OFF until such time as a master reset signal is generated. The normally prohibited number may then be dialed and will be recognized by the central office and acted on there. It will be read by the restrictor apparatus but not acted upon, as the disabling input to the timer switch over-rides the inhibiting input. It will be appreciated that the telephone call restrictor could be disabled in other ways than that specifically described, of course. If it is desired to make a local or otherwise non-prohibited call, dialing commenced prior to the expiration of the waiting period will prevent the load being turned ON, so immediate communication with the central office is possible. If the immediate communication comprises a prohibited number, this will be detected by the prohibited number detector and the attempted communication frustrated either by turning the load ON or by other conventional means.

It will be appreciated that the specific circuitry described above is illustrative of the invention only, and that other different circuitry may be employed to accomplish the aims of the invention. The scope of the invention is not therefore limited by the illustrative embodiment, the invention being defined in the claims appended hereto.

I claim:

1. A telephone call restrictor suitable for use in a PABX telephone system in the central office side thereof, comprising:
    terminal means for connecting said telephone call restrictor to a pair of lines outgoing from the PABX;
    load means connected to said terminal means whereby dial pulses received by said telephone call restrictor are inhibited from transmission to said central office;
    switch means actuatable to selectively disconnect said load means from said terminal means;
    counter means connected to said terminal means for counting the dial pulses of dialed digits, said counter means comprising first pulse detector means responsive to the receipt of dial pulses at said terminal means when said load means is disconnected and a second pulse detector means responsive to the receipt of dial pulses at said terminal means when said load means is connected;
    and code detection means programmable to provide an output signal on recognition of the receipt by said counter means of dial pulses forming one or more digits forming an access code;
    said output signal actuating said switch means to disconnect said load means whereby further dial pulses may be transmitted on said lines to said central office.

2. A telephone call restrictor as defined in claim 1 including prohibited number detection means which provides a second output signal on recognition of the receipt by said counter means of dial pulses forming at least one digit forming a prohibited number;
    and means operable by said second output signal to inhibit the transmission of signals to said central office, said first output signal serving to frustrate said second output signal.

3. A telephone call restrictor as defined in claim 2 wherein said means operable by said second output signal comprises said switch means and said load means.

4. A telephone call restrictor as defined in claim 2 further including means responsive to the seizure of a central office line for generating a reset signal serving to reset said telephone call restrictor, said switch means in a reset condition disconnecting said load means.

5. A telephone call restrictor as defined in claim 4 including means for recognizing when said system is in a condition for the receipt of dial signals by the central office and providing a third output signal several seconds after the continued recognition of said condition, and responsive to the receipt at said terminals of a dial pulse within this period to frustrate said third output signal, and third output signal actuating said switch means to connect said load.

6. A telephone call restrictor as defined in claim 5 wherein the impedance across said terminal means when said load means is disconnected is at least 1 megohm.

7. A telephone call restrictor as defined in claim 5 wherein said second pulse detector means includes a light emitting diode which forms at least part of said load means.

8. A telephone call restrictor as defined in claim 6 wherein said first pulse detector means is a CMOS gate.

9. A telephone call restrictor having means for authorized persons to overcome the restriction by dialing an access code on a normal telephone set connected with the system, comprising
 connection means for connecting the restrictor to a telephone line;
 counter means connected with said connection means for receiving dial pulse signals and for counting the pulses for digits dialed;
 programmable means connected to said counter means and having prohibited number detection means connected to said counter means for recognizing a predetermined digit or combination of digits representing a prohibited number and providing at recognition an inhibit signal;
 switch means responsive to the receipt of an inhibit signal for connecting a resistance across said telephone line, said resistance having a resistance value low enough to prevent dial pulses being received at a central office;
 pulse detector means connected to said connection means for detecting dial pulses when said resistance is connected across said telephone line, and being connected to said counter means to provide detected dial pulse signals thereto;
 a code detector connected to said counter means for recognizing a predetermined combination of digits representing an access code and providing at recognition a reset signal, and
 a reset circuit responsive to said reset signal for resetting said switch means to remove said resistance and to permit dialed pulses to be received at said central office.

10. A telephone call restrictor as defined in claim 9 in which the connection between said pulse detector means and said counter means includes an optical coupler.

11. A telephone call restrictor as defined in claim 9 further including means for recognizing when said line is conditioned to transmit to the central office, and providing at recognition a second inhibit signal, circuit means including a relatively long delay means for applying said second inhibit signal to said switch means when the duration of said second inhibit signal exceeds the delay period provided by said delay means and means responsive to the receipt at said connection means of a dial pulse prior to said time delay period exceeded for frustrating said second inhibit signal.

12. A telephone call restrictor as defined in claim 9 wherein said switch means includes a timer switch which responds to the removal of the inhibit signal to disconnect said resistance after a delayed period and which responds immediately to the receipt of a reset signal.

13. A telephone call restrictor as defined in claim 12 wherein said counter means includes a '9' terminal providing a transient output signal therefrom when the number '0' is dialed at least as a first digit and a steady output signal therefrom when the number '9' is dialed at least as a first digit, and wherein said prohibited number detection means connects to said '9' terminal to provide a '9' inhibit signal of similar duration to the output signal at said '9' terminal, further including circuit means including a short delay means providing a delay period greater than the period of said transient output to apply said '9' inhibit signal to reset said timer switch when said '9' inhibit signal exceeds the delay period of said short delay means.

14. A telephone call restrictor as defined in claim 13 including means for recognizing when said line is conditioned to transmit to the central office and providing at recognization a second inhibit signal circuit means for applying said second inhibit signal to said switch means, and means responsive to said second inhibit signal for frustrating the application of the '9' inhibit signal to reset the timer switch.

15. A telephone call restrictor as defined in claim 13 wherein said short delay means period is about 200 ms.

16. A telephone call restrictor as defined in claim 11 wherein said means for recognizing when said line is conditioned to transmit to the central office includes a voltage detecting means having an enabling output when the voltage on said line is in excess of about 5 volts and an off-hook detector having an enabling output when the voltage on said line is in the normal off-hook voltage range, said enabling outputs together generating said second inhibit signal.

17. A telephone call restrictor suitable for use in a PABX telephone system in the central office side thereof, comprising:
 terminal means for connecting said telephone call restrictor to a pair of lines outgoing from the PABX;
 load means connected to said terminal means whereby dial pulses received by said telephone call restrictor are inhibited from transmission to said central office;
 switch means actuatable to selectively disconnect said load means from said terminal means;
 counter means connected to said terminal means for counting the dial pulses and dialed digits;
 code detection means programmable to provide an output signal on recognition of the receipt by said counter means of dial pulses forming one or more digits forming an access code;
 said output signal serving to actuate said switch means to disconnect said load means whereby further dial pulses may be transmitted on said lines to said central office;
 prohibited number detection means to provide a second output signal on recognition of the receipt by said counter means of dial pulses forming at least one digit forming a prohibited number;
 said second output signal serving to actuate said switch means to connect said load means, said first output signal also serving to frustrate said second output signal;
 means responsive to the seizure of a central office line for generating a reset signal serving to reset said telephone call restrictor and actuate said switch means to disconnect said load means; and means for recognizing when said system is in a condition for receipt of dial signals by the central office and providing a third output signal several seconds after the continued recognition of said condition, said third output signal serving to actuate said switch to connect said load means.

18. A telephone call restrictor as defined in claim 17 wherein said means for recognizing when said system is in a condition for the receipt of dial signals is responsive to the receipt at said terminals of a dial pulse prior to the generation of said third output signal to frustrate said third output signal.